United States Patent Office 3,134,780
Patented May 26, 1964

3,134,780
HETEROCYCLIC DIMALONONITRILES
Alexander T. Shulgin, Lafayette, Calif., assignor to The Dow Chemical Company, Midland, Mich., a corporation of Delaware
No Drawing. Filed July 13, 1961, Ser. No. 123,669
3 Claims. (Cl. 260—268)

This invention concerns certain new substituted malononitriles, and particularly certain piperazin-1,4-ylenedimethylidynedimalononitriles having a structure corresponding to the formula

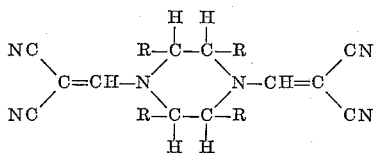

wherein R represents hydrogen or methyl. In view of the present definition, it is apparent that compounds representative of the present invention include 2,3,5,6-tetramethyl-1,4 - piperazinylenedimethylidynedimalononitrile, 2,5-dimethyl - 1,4 - piperazinylenedimethylidynedimalononitrile, piperazin - 1,4 - ylenedimethylidynedimalononitrile and the like.

These new compounds are crystalline solids appearing off-white to brown in mass; somewhat soluble in many common organic solvents such as lower alkylamines, acetone, methylethyl ketone and ethyl alcohol and of very low solubility in water. They are useful as parasiticides and are adapted to be employed for the control of agricultural pests such as fungus diseases.

The new compounds are prepared by causing a reaction between an alkoxymethylenemalononitrile and a piperazine compound corresponding to the formula

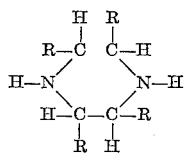

The reaction is advantageously carried out in a liquid reaction medium which may, for example, be ethanol. The reaction initiates readily at temperatures in the range of 25°–150° C., although temperatures as high as about 80°–150° C. may be advantageously used to drive the reaction to completion. Representative piperazine compounds to be employed include piperazine itself, 2,5-dimethylpiperazine, and 2,3,5,6-tetramethylpiperazine, and the like.

In carrying out the reaction, the piperazine and the alkoxymethylenemalononitrile are intimately contacted together. Preferably, the contacting is carried out in an inert solvent which may conveniently be water or a lower alkanol such as methanol, or ethanol. The reaction initiates readily with heating; therefore, the contacting of the reactants is conveniently carried out initially with heating to a reaction temperature range. Temperature ambient the reaction may conveniently be limited by the boiling temperature of solutions or suspensions thereof in most liquid reaction media. The reaction by which the present products are obtained takes place between 1 molecular proportion of the piperazine compound and 2 molecular proportions of the alkoxymethylenemalononitrile reactant. Desirably, reactants are employed in about these proportions. If employed proportions of reactants differ from the above-indicated stoichiometric proportions, in general the reactant in excess thereof will appear as an impurity in, and may be removed from, the resulting product.

Upon completion of the reaction, the resulting reaction mixture is usually filtered to separate product. Products insoluble at high temperatures may be removed by filtration hot. Also the resulting reaction mixture may be cooled to about room temperature whereupon the desired product may usually be separated as a solid by filtration or the like from the reaction mixture. Alternatively, the reaction mixture may be warmed under subatmospheric or atmospheric pressure to vaporize and remove liquid reaction medium and alkanol by-product of reaction, to obtain the desired product. When the desired product contains, as impurity, unreacted starting material, such material may be removed by washing with portions of solvent such as lower alkanol, for instance ethanol. The resulting product may be further purified by conventional techniques such as by washing with further portions of lower alkanol, and recrystallization from various organic solvents.

The following examples merely illustrate the present invention but are not to be construed as limiting it.

EXAMPLE 1

*Piperazin-1,4-Ylenedimethylidynedimalononitrile*

A solution of 4.1 grams (0.34 mole) ethoxymethylenemalononitrile in about 10 milliliters ethanol (warm to the hand) is added as a single portion, with stirring to, a solution of 3.3 grams (0.019 mole) of piperazine (in the form of its hexahydrate) in 5 milliliters warm ethanol. An exothermic reaction takes place at once and the temperature of the resulting reaction mixture becomes quite warm to the hand. The desired product crystallizes spontaneously from the resulting mixture and is hastened and rendered more complete by chilling the mixture, as over ice. The product is then removed by filtration and thereafter air dried, to obtain 2.0 grams (0.008 mole) of piperazin-1,4-ylenedimethylidynedimalononitrile product as a light brown solid melting with decomposition at a temperature somewhat above 360° C. The product had, upon analysis, 33.0 percent nitrogen by weight as compared with theoretical value of 33.9 percent. Yield was 20 percent of theoretically perfect based upon starting materials.

The compound piperazin-1,4-ylenedimethylidynedimalononitrile is distinctly and specifically toxic to fungi and, when formulated with adjuvant substances as a water spray, was highly effective in protecting young tomato plants from subsequent infestation by innoculation with live spores of tomato early blight.

EXAMPLE 2

*2,5-Dimethyl-1,4-Piperazinylenedimethylidynedimalononitrile*

In procedures essentially the same as the foregoing except that the employed piperazine reactant is 2,5-dimethylpiperazine and reaction time at room temperature is approximately 48 hours, there is prepared a 2,5-dimethyl-1,4-piperazinylenedimethylidynedimalononitrile product as a brown crystalline solid melting with decomposition at about 324° C. The compound had a nitrogen content of 30.81 percent by weight, as compared with a theoretical value of 31.56. Yield was 0.003 mole, 15 percent of theoretically perfect.

EXAMPLE 3

*2,3,5,6-Tetramethyl-1,4-Piperazinylenedimethylidynedimalononitrile*

In procedures essentially the same as the foregoing except that the employed piperazine compound is 2,3,5,6- tetramethylpiperazine, there is prepared a 2,3,5,6-tetramethyl-1,4-piperazinylenedimethylidynedimalononitrile. The compound has the appearance of brown crystals that decompose without distinctly melting; the compound is toxic to proliferating spores of fungi.

The new compounds of the present invention have been found to be useful as parasiticides and are adapted to be employed for the control of various pests. For use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions, or water dispersions with or without the aid of dispersing or emulsifying agents. In a representative operation, the application as a thorough wetting spray to young tomato plants of a composition containing piperazin-1,4-ylenedimethylidynedimalononitrile at the rate of 600 parts per million parts by weight of ultimate composition afforded commercially satisfactory protection against subsequent innoculation with viable spores of the fungus *Alternaria solani* whereas plants similarly inoculated with the fungus but without protection from the present compound were uniformly and heavily infested.

I claim:
1. A piperazin-1,4-ylenedimethylidynedimalononitrile of the formula

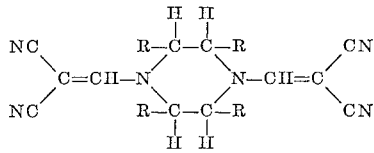

wherein R is selected from the group consisting of hydrogen and methyl.
2. Piperazin-1,4-ylenedimethylidynedimalononitrile.
3. 2,5-dimethyl-1,4-piperazinylenedimethylidynedimalononitrile.

References Cited in the file of this patent
UNITED STATES PATENTS
3,057,864     Shulgin _____ Oct. 9, 1962

OTHER REFERENCES

American Cyanamid, The Chemistry of Acrylonitrile, 2nd edition, pp. 169, 177, 185, 200, 205, American Cyanamid Co., Petro-Chemicals Department, New York (1959).